US009007523B2

(12) United States Patent
Choi et al.

(10) Patent No.: US 9,007,523 B2
(45) Date of Patent: Apr. 14, 2015

(54) SYSTEM AND METHOD FOR CONTROLLING MOTION USING TIME SYNCHRONIZATION BETWEEN PICTURE AND MOTION

(71) Applicant: CJ 4D Plex Co., Ltd., Seoul (KR)

(72) Inventors: Jae Sung Choi, Seoul (KR); Jin Yong Park, Bucheon-si Gyeonggi-do (KR)

(73) Assignee: CJ 4D Plex Co., Ltd., Seoul (KR)

(*) Notice: Subject to any disclaimer, the term of this patent is extended or adjusted under 35 U.S.C. 154(b) by 0 days.

(21) Appl. No.: 14/353,350

(22) PCT Filed: Dec. 6, 2012

(86) PCT No.: PCT/KR2012/010501
§ 371 (c)(1),
(2) Date: Apr. 22, 2014

(87) PCT Pub. No.: WO2013/125773
PCT Pub. Date: Aug. 29, 2013

(65) Prior Publication Data
US 2014/0313410 A1    Oct. 23, 2014

(30) Foreign Application Priority Data
Feb. 20, 2012    (KR) .................. 10-2012-0016888

(51) Int. Cl.
H04N 7/00       (2011.01)
H04N 11/00      (2006.01)
H04N 5/222      (2006.01)
H04N 5/04       (2006.01)
H04N 21/41      (2011.01)
H04N 21/8547    (2011.01)

(52) U.S. Cl.
CPC .............. *H04N 5/04* (2013.01); *H04N 21/4131* (2013.01); *H04N 21/8547* (2013.01)

(58) Field of Classification Search
USPC .................................................. 348/460, 722
See application file for complete search history.

(56) References Cited

U.S. PATENT DOCUMENTS 5,486,141 A * 1/1996 Ohga et al. ..................... 472/60
5,669,818 A * 9/1997 Thorner et al. ................. 463/30
(Continued)

FOREIGN PATENT DOCUMENTS

JP    09-172811 A     7/1997
KR    10-1005320 B1   1/2011
(Continued)

OTHER PUBLICATIONS

International Search Report mailed Jan. 30, 2013 in PCT/KR2012/010501.
(Continued)

*Primary Examiner* — Brian Yenke
(74) *Attorney, Agent, or Firm* — Plumsea Law Group, LLC

(57) ABSTRACT

Provided are a system and a method for controlling a motion using time synchronization between a picture and the motion, and more particularly, a motion code corresponding to a time code is prestored before showing the picture and the motion is controlled according to the prestored motion code when the picture showing starts while a current motion driving time is compared with a reference time of the picture and then synchronized to provide a high-resolution precision motion to a user while achieving accurate synchronization with the picture.

9 Claims, 3 Drawing Sheets

(56) References Cited

U.S. PATENT DOCUMENTS

| | | | |
|---|---|---|---|
| 6,659,773 B2* | 12/2003 | Roy et al. | 434/55 |
| 7,656,388 B2* | 2/2010 | Schena et al. | 345/158 |
| 7,821,493 B2* | 10/2010 | Tierling et al. | 345/156 |
| 8,113,839 B2* | 2/2012 | Kokubo et al. | 434/58 |
| 8,447,824 B2* | 5/2013 | Hong et al. | 709/208 |
| 8,468,280 B2* | 6/2013 | Paillard | 710/65 |
| 8,700,791 B2* | 4/2014 | Lacroix et al. | 709/231 |
| 8,773,238 B2* | 7/2014 | Menard et al. | 340/4.2 |
| 2001/0036868 A1* | 11/2001 | Roy et al. | 472/130 |
| 2004/0015983 A1* | 1/2004 | Lemmons | 725/12 |
| 2007/0126927 A1* | 6/2007 | Yun et al. | 348/473 |
| 2008/0002390 A1* | 1/2008 | Paillard | 362/85 |
| 2008/0109265 A1* | 5/2008 | Roy et al. | 705/5 |
| 2008/0223627 A1 | 9/2008 | Lacroix et al. | |
| 2008/0263620 A1* | 10/2008 | Berkvens et al. | 725/136 |
| 2010/0061405 A1* | 3/2010 | Berkvens et al. | 370/503 |
| 2010/0225810 A1* | 9/2010 | Berkvens et al. | 348/500 |
| 2010/0245116 A1* | 9/2010 | Senecal et al. | 340/825.52 |
| 2011/0319180 A1* | 12/2011 | Lee | 472/75 |
| 2012/0019352 A1* | 1/2012 | Menard et al. | 340/4.2 |
| 2012/0221148 A1* | 8/2012 | Menard et al. | 700/275 |

FOREIGN PATENT DOCUMENTS

| | | |
|---|---|---|
| KR | 10-1075122 B1 | 10/2011 |
| KR | 2001-0096868 A | 11/2011 |
| WO | 2007/047960 A2 | 4/2007 |
| WO | 2007/072326 A2 | 6/2007 |
| WO | 2008/065587 A2 | 6/2008 |
| WO | 2010/078657 A1 | 7/2010 |

OTHER PUBLICATIONS

Russian Office Action mailed Nov. 1, 2013 in Russian Application No. 2012132216/08.

European Search Report dated May 6, 2013 in European Application No. 13 15 5827.

Korean Notice of Allowance dated May 29, 2012 in Korean Application No. 10-2012-0016888.

* cited by examiner

SYSTEM AND METHOD FOR CONTROLLING MOTION USING TIME SYNCHRONIZATION BETWEEN PICTURE AND MOTION

CROSS REFERENCE TO RELATED APPLICATION

This application is a US National Stage of International Application No. PCT/KR2012/010501 filed Dec. 6, 2012, which claims priority to Korean Patent Application No. 10-2012-0016888 filed Feb. 20, 2012, the contents of all of which are incorporated herein by reference in their entity.

FIELD OF THE INVENTION

The present disclosure relates to a system and a method for controlling a motion using time synchronization between a picture and the motion, and more particularly, to a system and a method for controlling a motion using time synchronization between a picture and the motion that prestore a motion code corresponding to a time code before showing pictures and control the motion according to the prestored motion code when the picture showing starts, while a current motion driving time is compared with a reference time of the picture and then synchronized to provide a high-resolution precision motion to a user while achieving accurate synchronization with the picture.

BACKGROUND

In a facility of showing pictures, such as a theater or a cinema, only the pictures were shown to spectators in the related art, but various effects have been provided while the pictures have been shown in recent years.

If a cinema of showing general pictures is referred as to a 2D cinema and a cinema of showing specially photographed pictures in order for the spectators to feel a 3D effect at the time of viewing the pictures is referred to as a 3D cinema, a cinema where the spectators view the pictures while feeling five senses by simulating the sense of touch, the sense of smell, and the like in addition to the senses of sight and hearing is a 4D cinema.

In the 4D cinema, a motion base that moves a seat on which the spectator sits is installed below the seat and special effect devices providing various effects to the spectators are installed on the seats and inner walls or a ceiling of the cinema.

When the spectator views a movie while sitting on the seat, the spectator may feel improved excitement and the feeling of being immersed in the movie while directly experiencing the motion synchronized with the picture and effects such as water, wind, smoke, flash, heat, and the like, not viewing only the picture.

In the facility of showing pictures, a seat implements a feeling as if the spectator actually moves by moving the seat at the degrees of freedom such as up and down, left and right, front and rear, and the like by using an actuator. A motion of the actuator is controlled by a motion controller.

To this end, a central server transmits a time code and a motion code in a streaming scheme to the motion controller. In a motion code transmission technique of the streaming scheme as a scheme of streaming the motion code according to the time code, a streamed motion is synchronized with the time code to be streamed to a plurality of motion controllers. Subsequently, the motion controller drive-controls the motion of the actuator according to the motion code at a picture showing time corresponding to the time code.

In recent years, in the facility of showing pictures, even as the number of seats increases, a more exquisite motion tends to be implemented. In order for the motion controller to control the more exquisite motion while implementing the motions of the plurality of seats, the amount of data and data transmission rate of the motion code need to be increased and the amount of processed data of the motion code processed in the motion controller needs to be increased.

However, in the motion code transmission technique of the streaming scheme, the motions of the plurality of seats cannot be accurately synchronized with the picture. The plurality of motion controllers need to receive the same motion code at the same time, but it is difficult for the plurality of motion controllers to receive a large quantity of motion codes at the same time, and as a result, in some actuators or some motion controllers, an error of the motion code may occur at the picture showing time.

When a problem occurs in a transmission network of the entire facility of showing pictures, in the motion code transmission technique of the streaming scheme, the motion controller cannot receive the motion code while showing the pictures, and as a result, the motion driving of the seat stops.

Meanwhile, the central server is implemented as a server with a processor, and in order to transmit the motion code to the plurality of motion controllers in a real-time streaming scheme, the data transmission rate decreases, such that a motion code having high resolution cannot be transmitted. That is, the motion code transmission technique of the streaming scheme cannot implement a high-resolution and precision motion.

SUMMARY

The present disclosure has been made in an effort to provide a system and a method for controlling a motion using time synchronization between a picture and the motion that prestore a motion code corresponding to a time code before showing a picture and control the motion according to the prestored motion code when the picture showing starts, while a current motion driving time is compared with a reference time of the picture and then synchronized to provide a high-resolution precision motion to a user while achieving accurate synchronization with the picture.

According to a first aspect of the present disclosure, there is provided a system for controlling a motion using time synchronization between a picture and the motion, comprising: a picture server configured to show the picture in a facility of showing pictures and transmit a time code corresponding to the picture; a central server configured to transmit a reference time of the picture by analyzing the time code received from the picture server; and a motion controlling device configured to prestore a motion code corresponding to the time code before showing the picture and control the motion of an actuator according to the prestored motion code when the picture showing starts, a current motion driving time being synchronized with the received reference time of the picture by comparing the current motion driving time with the reference time of the picture received from the central server.

According to a second aspect of the present disclosure, there is provided a method for controlling a motion using time synchronization between a picture and the motion, comprising: prestoring, by a motion controlling device, a motion code corresponding to a time code before showing the picture in a facility of showing pictures; controlling, by a motion controlling device, the motion of an actuator according to the prestored motion code when picture showing starts; receiving, by the motion controlling device, a reference time of the picture from a central server; and synchronizing, by the motion controlling device, a current motion driving time with the received reference time of the picture by comparing the current motion driving time with the received reference time of the picture.

According to exemplary embodiments of the present disclosure, a motion code corresponding to a time code is prestored before showing a picture and the motion is controlled according to the prestored motion code when the picture showing starts, and a current motion driving time is compared with a reference time of the picture and then synchronized to provide a high-resolution precision motion to a user while achieving accurate synchronization with the picture.

A large quantity of motion codes are stored through offline in advance before showing a picture and motion driving starts or ends according to a picture showing start/end signal while showing the picture, such that a motion controlling device can control an actuator according to a motion code which is previously stored even though a transmission network of a facility of showing pictures is unstable or discontinued, thereby providing a continuous motion effect to the user.

DETAILED DESCRIPTION

Figure 1:
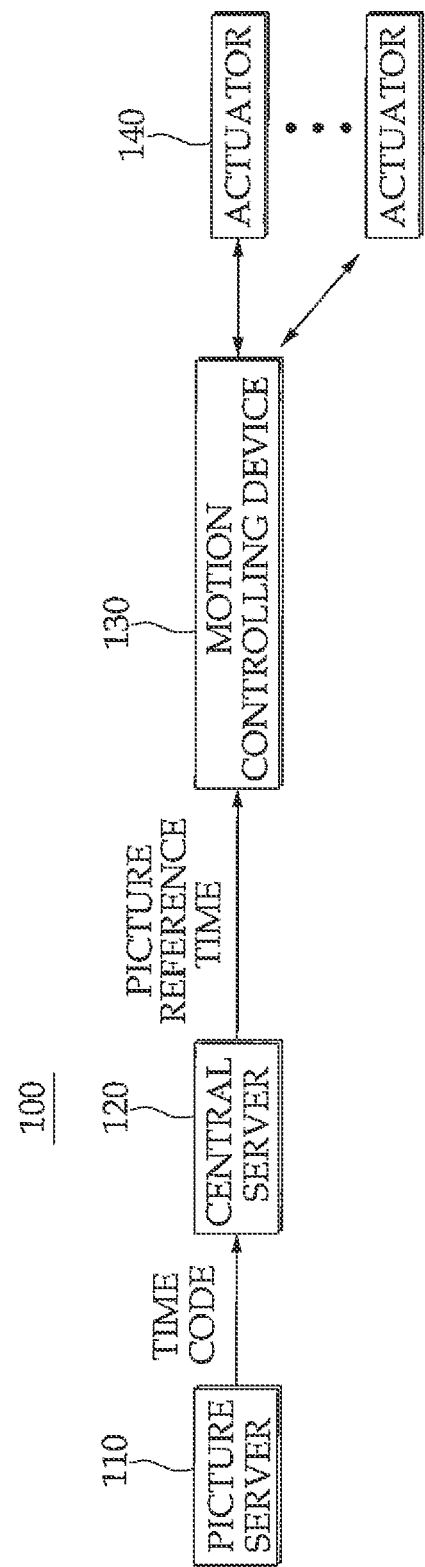
FIG. 1 is a configuration diagram of a system for controlling a motion using time synchronization between a picture and the motion according to an exemplary embodiment of the present disclosure.

Hereinafter, exemplary embodiments of the present disclosure will be described in detail with reference to the accompanying drawings. The configurations of the present disclosure and the resulting operational effects will be apparently appreciated through the detailed description described as below. Prior to the detailed description of the present disclosure, like reference numerals refer to like elements as possible even though like elements are shown in different drawings and it is noted that a detailed description of the known configurations will be omitted when it is judged that the known configurations may obscure the gist of the present disclosure.

FIG. 1 is a configuration diagram of a system for controlling a motion using time synchronization between a picture and the motion according to an exemplary embodiment of the present disclosure.

As illustrated in FIG. 1, the system 100 for controlling a motion according to the exemplary embodiment of the present disclosure includes a picture server 110, a central server 120, a motion controlling device 130 and a plurality of actuators 140. Herein, the entire facility of showing pictures includes the plurality of motion controlling devices 130 and the plurality of actuators 140 controlled by the respective motion controlling devices 130.

The motion controlling system 100 according to the exemplary embodiment of the present disclosure prestores a motion code corresponding to a time code before showing a picture. This is to store a motion code having high resolution in the motion controlling device 130 in advance because it is difficult to transmit the motion code in a real-time streaming scheme. Therefore, the motion controlling system 100 may provide a high-resolution precision motion to a user while being accurately synchronized with the picture.

Herein, the motion code is expressed as digitalized figures. The fact that the motion code has high resolution represents that resolution is high when a position command update frequency of the motion is high and represents that resolution is low when the position command update frequency is low. For example, when the motion (high-resolution motion) code is implemented as a sine wave, the high-resolution motion may be converted at a minute interval at the time of converting the sine-wave motion into the digital figure. The digital figures of the high-resolution motion are also minutely divided. For example, the performance of a high-performance actuator having high performance has a resolution of 25 Hz. In order to increase motion control performance for the high-performance actuator, when the motion code is position-updated at 100 Hz, the motion has high resolution. On the contrary, a low-resolution motion code meaning that resolution is low represents that the motion is expressed widely.

Hereinafter, constituent members of the motion controlling system 100 according to the exemplary embodiment of the present disclosure will be described. The picture server 110 shows the picture to the user in the facility of showing pictures. The picture server 110 transmits a time code corresponding to the picture to the central server 120. In general, as the picture, 24 frames are continuously shown every 1 second in the facility of showing pictures. The frame is a still screen of the picture and the time code is present for each frame. Herein, the time code represents time information synchronized with the picture. The picture server 110 transmits the time code to the central server 120.

The central server 120 receives a picture showing start signal of the picture or a picture showing end signal of the picture from the picture server 110 and transmits the received signal to the motion controlling device 130. The central server 120 analyzes the time code received from the picture server 110 and notifies a reference time of the picture to the motion controlling device 130 when picture showing starts. Herein, the time code may be a linear time code (LTC). The linear time code may be transmitted with being inserted into an audio line on the transmission network. The central server 120 transmits the reference time of the picture to the motion controlling device 130 periodically or at a predetermined time (for example, a plurality of time defined previously in the picture showing time). For example, the central server 120 transmits the reference time of the picture to the motion controlling device 130 through a network once at 10 seconds or once at 20 seconds.

The plurality of actuators 140 is installed for each seat unit or seat set to drive the seat according to the predetermined degree of freedom. For example, the plurality of actuators 140 may implement three degree-of-freedom motions (for example, roll, pitch and heave) or four degree-of-freedom motions (roll, pitch, heave and sway) according to a driving pattern.

The motion controlling device 130 prestores the motion code corresponding to the time code before showing a picture. The motion controlling device 130 controls the motion of the actuator according to the prestored motion code when the picture showing starts. In this case, the motion controlling device 130 compares the reference time of the picture received from the central server 120 with a current motion driving time to synchronize the current motion driving time with the received reference time of the picture.

Meanwhile, in another exemplary embodiment in which the picture server 110 includes an analysis module of the time code, the picture server 110 analyzes the time code to calculate the reference time of the picture and transmit the calculated reference time of the picture to the motion controlling device 130. Then, the motion controlling device 130 receives the reference time of the picture from the picture server 110 and compares the received reference time of the picture with the current driving time to perform the aforementioned synchronization.

Figure 2:
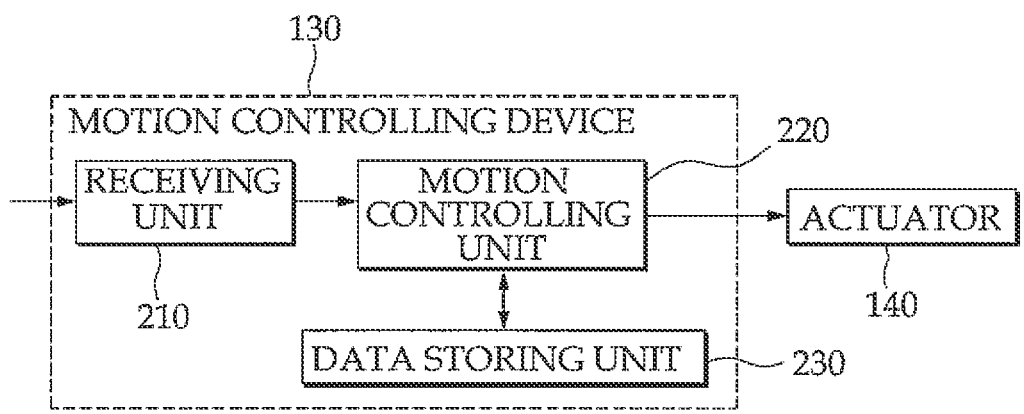
FIG. 2 is a detailed configuration diagram of a motion controlling device of FIG. 1 according to the exemplary embodiment of the present disclosure.

FIG. 2 is a detailed configuration diagram of the motion controlling device of FIG. 1 according to the exemplary embodiment of the present disclosure.

As illustrated in FIG. 2, the motion controlling device 130 includes a receiving unit 210, a motion controlling unit 220 and a data storing unit 230.

The data storing unit 230 prestores the motion code corresponding to the time code before showing the picture.

The receiving unit 210 receives the reference time of the picture from the central server 120. The receiving unit 210 receives a motion start signal or a motion end signal depending on a picture showing start time of the picture from the central server 120.

The motion controlling unit 220 controls the motion of the actuator 140 according to the motion code prestored in the data storing unit 230 when picture showing starts. The motion controlling unit 220 reads the motion code corresponding to the motion driving time through a clock provided therein from the data storing unit 230 to control the motion of the actuator 140.

When the receiving unit 210 receives the reference time of the picture, the motion controlling unit 220 compares the current motion driving time with the reference time of the picture received by the receiving unit 210. The motion controlling unit 220 may compare the reference time of the picture with the current motion driving time periodically or at a predetermined time without comparing the current motion driving time with the reference time of the picture in real time.

The motion controlling unit 220 synchronizes the current motion driving time with the received reference time of the picture when an error occurs between the reference time of the picture and the current motion driving time. That is, the motion controlling unit 220 adjusts a current self-clock time, that is, a running time with the reference time of the picture. In this case, the motion controlling unit 220 may synchronize the current motion driving time with the reference time of the picture when an error time between the received reference time of the picture and the current motion driving time is more than a predetermined threshold time. As a result of comparing the current motion driving time with the reference time of the picture, the motion controlling unit 220 may synchronize the current motion driving time with the reference time of the picture even when the current motion driving time is not more than the predetermined threshold time. For example, when the current motion driving time is earlier than the reference time of the picture, the motion controlling unit 220 controls the motion by delaying the current motion driving time by the error time. On the contrary, when the current motion driving time is later than the reference time of the picture, the motion controlling unit 220 controls the motion by advancing the current motion driving time by the error time.

Herein, when the current motion driving time is synchronized with the reference time of the picture, a discontinuous motion may occur. The motion controlling unit 220 performs smoothing by filtering the discontinuous motion when the discontinuous motion occurs. Herein, the motion controlling unit 220 performs smoothing according to a predetermined synchronization profile in order to filter the discontinuous motion.

Figure 3:
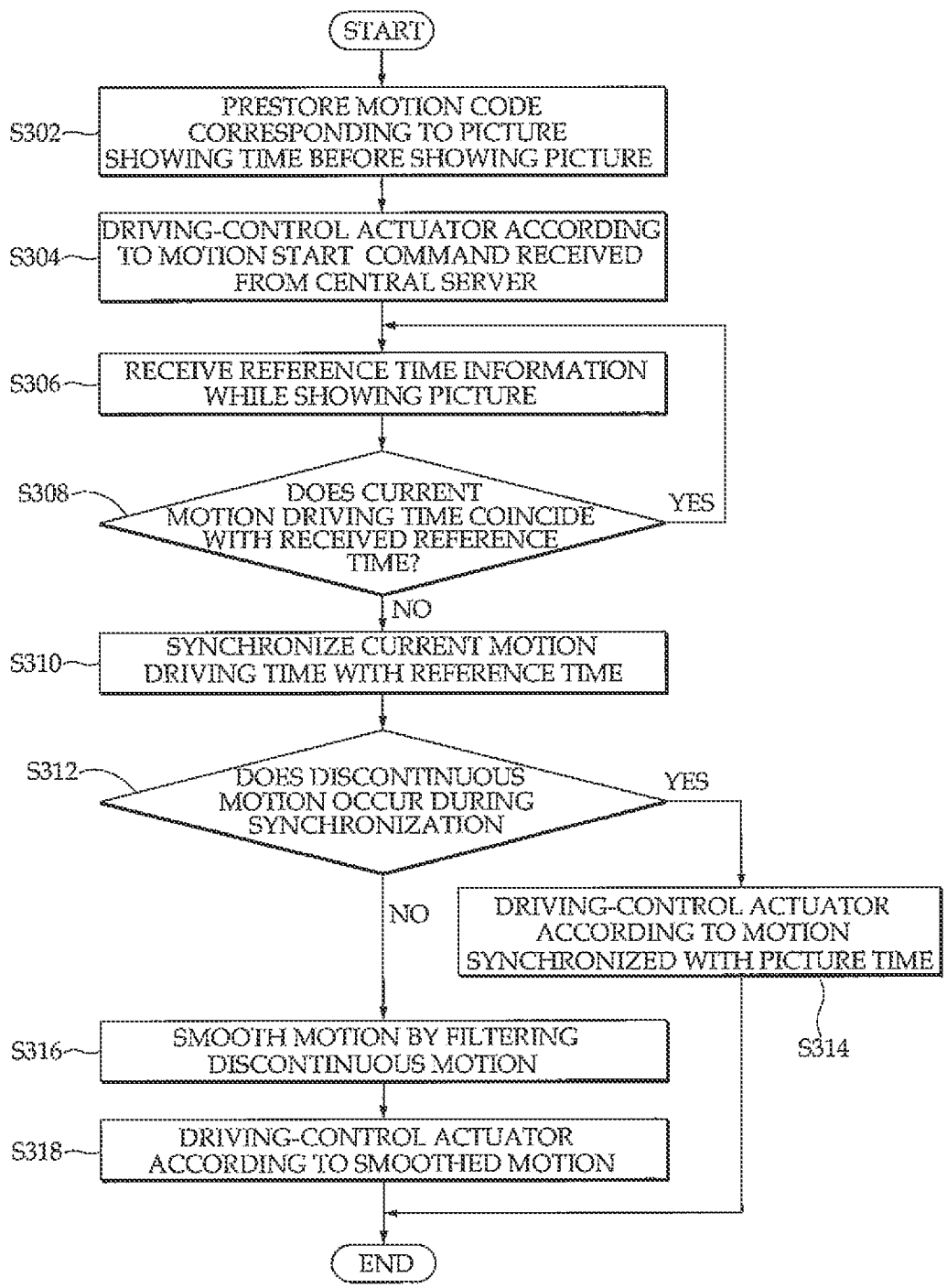
FIG. 3 is a flowchart of a method for controlling a motion using time synchronization between a picture and the motion according to an exemplary embodiment of the present disclosure.

FIG. 3 is a flowchart of a method for controlling a motion using time synchronization between a picture and the motion according to an exemplary embodiment of the present disclosure.

The motion controlling device 130 prestores the motion code corresponding to the picture showing time before showing the picture (S302).

The motion controlling device 130 driving-controls the actuator according to the motion start command received from the central server 120 (S304).

The motion controlling device 130 receives the reference time of the picture while the picture is shown (S306).

The motion controlling device 130 verifies whether the current motion driving time coincides with the received reference time of the picture (S308).

According to the verification result (S308), when the current motion driving time does not coincide with the reference time of the picture, that is, when the error time between the reference time of the picture and the current motion driving time occurs, the motion controlling device 130 synchronizes the current motion driving time with the reference time (S310). On the contrary, when the current motion driving time coincides with the reference time of the picture, the motion controlling device 130 performs S308 and subsequent processes again.

Thereafter, the motion controlling device 130 verifies whether the discontinuous motion occurs during the synchronization as the process of S310 (S312). According to the verification result (S312), the motion controlling device 130 smoothes the motion by filtering the discontinuous motion when the discontinuous motion occurs during the synchronization (S314).

The motion controlling device 130 driving-controls the actuator according to the smoothed motion (S316).

On the contrary, according to the verification result (S312), when the discontinuous motion does not occur during the synchronization, the motion controlling device 130 driving-controls the actuator according to the motion synchronized with the picture showing time (S318).

From the foregoing, it will be appreciated that various embodiments of the present disclosure have been described herein for purposes of illustration, and that various modifications may be made without departing from the scope and spirit of the present disclosure to those skilled in art. Therefore, the exemplary embodiments disclosed in the specification of the present disclosure do not limit the present disclosure. The scope of the present disclosure should be analyzed by the appended claims and it should be understood that all arts in the equivalent scope are included in the scope of the present disclosure.

In the exemplary embodiments of the present disclosure, the motion code corresponding to the time code is prestored before showing the picture and the motion is controlled according to the prestored motion code when the picture showing starts while the reference time of the picture and the current motion driving time are compared, which is synchronized to provide the high-resolution precision motion while achieving accurate synchronization with the picture. From this point of view, as the present disclosure exceeds a limit of an existing technology, marketing or business possibility of an applied apparatus as well as only using an associated technology is sufficient and the present disclosure can be obviously worked, and thus, the present disclosure has industrial applicability.

The invention claimed is:

1. A system for controlling a motion using time synchronization between a picture and the motion, comprising:
   a picture server configured to show the picture in a facility of showing pictures and transmit a time code corresponding to the picture;
   a central server configured to transmit a reference time of the picture by analyzing the time code received from the picture server; and
   a motion controlling device configured to prestore a motion code corresponding to the reference time of the picture before showing the picture and control the motion of an actuator according to the prestored motion code when the picture showing starts, a current motion driving time being synchronized with the received reference time of the picture by comparing the current motion driving time with the reference time of the picture received from the central server,
   wherein the motion controlling device resets the current motion driving time according to the received reference time of the picture when a time difference between the received reference time of the picture and the current motion driving time is greater than a predetermined threshold, and
   wherein when the motion controlling device fails to receive the reference time of the picture or when the time difference between the received referenced time of the picture and the current motion driving time is less than or equal to the predetermined threshold, a clock of the motion controlling device determines the current motion driving time.

2. The system for controlling a motion using time synchronization between a picture and the motion of claim 1, wherein the motion controlling device comprises:
   a data storing unit configured to prestore the motion code corresponding to the reference time of the picture before showing the picture;
   a receiving unit configured to receive the reference time of the picture from the central server; and
   a motion controlling unit configured to control the motion of the actuator according to the prestored motion code when picture showing starts,
   wherein the motion controlling unit compares the current motion driving time with the received reference time of the picture to synchronize the current motion driving time with the received reference time of the picture.

3. The system for controlling a motion using time synchronization between a picture and the motion of claim 2, wherein the motion controlling unit compares the received reference time of the picture with the current motion driving time.

4. The system for controlling a motion using time synchronization between a picture and the motion of claim 2, wherein the motion controlling unit smoothes a discontinuous motion by filtering the discontinuous motion when the discontinuous motion occurs at the time of synchronizing the current motion driving time with the received reference time of the picture.

5. A method for controlling a motion using time synchronization between a picture and the motion, comprising:
   prestoring, by a motion controlling device, a motion code corresponding to a reference time of the picture before showing the picture in a facility of showing pictures;
   controlling, by a motion controlling device, the motion of an actuator according to the prestored motion code when picture showing starts;
   receiving, by the motion controlling device, a reference time of the picture from a central server; and
   synchronizing, by the motion controlling device, a current motion driving time with the received reference time of the picture by comparing the current motion driving time with the received reference time of the picture,
   wherein the motion controlling device resets the current motion driving time according to the received reference time of the picture when a time difference between the received reference time of the picture and the current motion driving time is greater than a predetermined threshold, and
   wherein when the motion controlling device fails to receive the reference time of the picture or when the time difference between the received reference time of the picture and the current motion driving time is less than or equal to the predetermined threshold, a clock of the motion controlling device determines the current motion driving time.

6. The method for controlling a motion using time synchronization between a picture and the motion of claim 5, further comprising:
   transmitting, by the central server, the reference time of the picture by analyzing the time code corresponding to the shown picture to the motion controlling device.

7. The method for controlling a motion using time synchronization between a picture and the motion of claim 5, wherein the motion controlling device, controls the motion of the actuator starts or ends when a picture start signal or a picture end signal of the shown picture is received in the receiving of the reference time of the picture.

8. The method for controlling a motion using time synchronization between a picture and the motion of claim 5, wherein the motion controlling device, compares the reference time of the picture received from the central server with the current motion driving time.

9. The method for controlling a motion using time synchronization between a picture and the motion of claim 5, wherein the motion controlling device, synchronizes smoothes a discontinuous motion by filtering the discontinuous motion when the discontinuous motion occurs at the time of synchronizing the current motion driving time with the received reference time of the picture.

* * * * *